United States Patent
Hou et al.

(10) Patent No.: US 11,724,776 B2
(45) Date of Patent: Aug. 15, 2023

(54) MULTIHULL STEPPED PLANING BOAT WITH MULTIPLE INDEPENDENT ELASTIC PLANING SURFACES

(71) Applicant: Shanghai Xiyi Craft Technologies Co., Ltd, Shanghai (CN)

(72) Inventors: Liang Hou, Shanghai (CN); Fengqin Jia, Shanghai (CN); Tao Wang, Shanghai (CN)

(73) Assignee: Shanghai Xiyi Craft Technologies Co., Ltd, Shanghai (CN)

( * ) Notice: Subject to any disclaimer, the term of this patent is extended or adjusted under 35 U.S.C. 154(b) by 48 days.

(21) Appl. No.: 17/558,189

(22) Filed: Dec. 21, 2021

(65) Prior Publication Data

US 2022/0111931 A1  Apr. 14, 2022

(30) Foreign Application Priority Data

Jan. 15, 2021 (CN) .......................... 202110053486.5

(51) Int. Cl.
    *B63B 1/14* (2006.01)
(52) U.S. Cl.
    CPC ...................................... *B63B 1/14* (2013.01)
(58) Field of Classification Search
    CPC ........................................................ B63B 1/14
    See application file for complete search history.

(56) References Cited

U.S. PATENT DOCUMENTS

| | | | |
|---|---|---|---|
| 2,972,974 A * | 2/1961 | Follett | B63B 1/242 114/280 |
| 5,415,120 A * | 5/1995 | Burg | B63B 1/12 180/126 |
| 6,880,477 B2 * | 4/2005 | Royle | B63B 1/38 114/67 R |

FOREIGN PATENT DOCUMENTS

| | | | | |
|---|---|---|---|---|
| CN | 207697606 U | | 8/2018 | |
| FR | 2451312 A1 * | | 3/1978 | ............... B63B 1/14 |
| FR | 2451312 A1 | | 10/1980 | |
| RU | 184134 U1 * | | 10/2018 | ............... B63B 1/14 |
| RU | 2752041 C1 * | | 7/2021 | ............... B63B 1/14 |
| WO | 2015184489 A1 | | 12/2015 | |
| WO | 2017147658 A1 | | 9/2017 | |

OTHER PUBLICATIONS

Zhao et al.; The Principle and Technique of High Performance Ships (Warships); pp. 243-244; Harbin Engineering University Press; Oct. 2013; ISBN: 9787566106971.

* cited by examiner

*Primary Examiner* — S. Joseph Morano
*Assistant Examiner* — Jovon E Hayes

(57) ABSTRACT

A multihull stepped planing boat with multiple independent elastic planing surfaces includes: a main hull, X front planing sub-hulls arranged side by side under a front portion of the main hull, and Y rear planing sub-hull arranged side by side under a rear portion of the main hull; wherein X and Y are positive integers, and 3≤X+Y≤8; the X front planing sub-hulls are equally spaced, and the Y rear planing sub-hulls are also equally spaced; there is a gap between the X front planing sub-hulls and the Y rear planing sub-hulls. The planing surface of the main hull is formed by a plurality of independent and spaced sub-planing surfaces. There is a certain elastic buffer space between each sub-planing surface and the main hull, and the shock absorption structures can absorb most of the shocks, thereby reducing the impact of water surface waves during high-speed navigation.

15 Claims, 8 Drawing Sheets

MULTIHULL STEPPED PLANING BOAT WITH MULTIPLE INDEPENDENT ELASTIC PLANING SURFACES

CROSS REFERENCE OF RELATED APPLICATION

The present invention claims priority under 35 U.S.C. 119(a-d) to CN 202110053486.5, filed Jan. 15, 2021.

BACKGROUND OF THE PRESENT INVENTION

Field of Invention

The present invention relates to a technical field of planing boats, and more particularly to multihull stepped planing boat with multiple independent elastic planing surfaces.

Description of Related Arts

There are four main types of high-speed ships: planing boat, hovercraft, hydrofoil, and ground-effect craft, each has their own advantages and disadvantages. Among them, the hull structure and construction technology of planing boat are the simplest and most widely used in high-speed craft. In particular, stepped planing boat has higher speed and good stability in still water, but also has a fatal disadvantage, that is, the stability in the waves is very poor, which is the greatest obstacle limiting the practical application of the stepped planing boat. Whether it can greatly improve the stability of the stepped planing boat in the waves is the key to expanding its application range.

As early as 1995, E. V. Lewis had proposed the concept of supercritical navigation of ships in waves. In regular waves, when the speed is low and the frequency of encountering waves is much lower than the natural frequency of the ship's natural vibration, it is a subcritical navigation state; and when the speed is high and the frequency of encountering waves is much greater than the natural frequency of the ship's natural vibration, it is a supercritical navigation state. The above two navigation states can make the hull have a smaller response in the waves. Irregular waves can be seen as the superposition of countless micro-amplitude sub-waves of different frequencies. A ship will inevitably resonate with certain sub-waves when sailing against the sea. However, the energy of the sub-waves in each frequency range is different, and usually the wave energy is mainly concentrated in a certain narrow frequency band. It is possible to avoid the resonance with high-energy sub-waves by making the encounter frequency of the ship and the wave much smaller or much larger than said frequency band. The former is called subcritical navigation and the latter is supercritical navigation.

It has been proved by practice that it is very difficult for conventional displacement ships to enter supercritical navigation because the required speed is too high for the displacement ships. Only certain high-speed destroyers can reach such speed when sailing in gentle wind and waves (high wave frequency), but impossible in big waves. If there is a big sway at this time, the only way is to reduce the speed to enter subcritical navigation. Some special displacement ships, such as small waterplane area twin-hull ships and wave piercing ships, can greatly reduce the pitch natural frequency of the ship by reducing the waterplane area, thereby entering the supercritical navigation state.

The speed of the planing boat can be very high, and it has a high frequency of encountering waves during sailing, but unlike the displacement ships, the pitch natural frequency of the planing boat increases linearly with the speed. Therefore, it is impossible to achieve supercritical navigation by increasing the speed. One exception is that the frequency of the wave itself is very high, but the corresponding wavelength is very short at this time and the motion response of the boat is not great. Therefore, supercritical navigation in the waves above the medium level is only possible through special means that the natural frequency of the longitudinal motion of the boat does not increase with the speed, which is also the basic characteristic of the supercritical planing boat.

The "sea-sword boat" appeared in the 1970s adopted a triangular slender planing surface. The lift of the planing surface is mainly concentrated in the rear. The change in the dynamic lift caused by the change of the slender and narrow front part is very small, which significantly reduced the response strength and self-roll frequency of the boat in sailing against waves. "Sea-sword boat" is the first supercritical planing boat, and its seakeeping performance has been significantly improved, especially the impact force in heading waves is greatly reduced. The seakeeping performance of such boat is successfully improved, but the slender hull brings a series of problems such as lateral stability, especially insufficient lateral stability during static buoyancy, difficulty in loading, and sensitivity to the changes in the center of gravity, making it difficult to enter engineering applications. To change the shortcomings, the use of twin-hull is an inevitable way.

In the 1980s, P. R. Payne proposed a twin-hull supercritical planing boat called "Wavestrider". It adopted a slender front canard planing surface and a tail hydrofoil, which having a channel. The planing boat was said to be capable of planing at a speed of 80 kn in Class 5 sea conditions. Unfortunately, this scheme did not succeed. The conclusion of the US DTRC evaluation pointed out that the lift of the planing surface and the tail hydrofoil was overestimated, and the too low channel caused serious water erosion, which prevented the boat from exceeding the peak resistance, leading to the failure of the entire scheme.

Although the result of the development from "sea-sword boat" to "wavestrider" was a failure, it gave us a very useful technical enlightenment, that is, if we want to achieve supercritical navigation on a planing boat, the multihull planing boat is a very promising research direction.

In a conventional multihull ship (including twin-hull, tri-hull, four-hull, five-hull, etc.), the sub-hulls (slices) are rigidly connected together by deck bridges, so in essence, they still belong to the same rigid structure and actually form a one-piece ship. The only difference is that the wet surface under the waterplane is divided into several independent areas. It has been proved by experiments that no matter how the hull shape of the multihull is changed, it is difficult to achieve supercritical navigation on the rigid multihull scheme.

Based on the above recognition, the applicants adopted innovative thinking, integrated the advantages of various ship types, and carried out in-depth research and exploration in the technical direction of planing boats, stepped planing boats, supercritical planing boats and multihull planing boats. After years of hard work and a large number of experiments, the applicants finally found a unique way and proposed a multihull stepped planing boat with multiple independent elastic planing surfaces. Model test and ship test were successful and major technological breakthroughs were made. The present invention successfully solved the world's problems in the field of high-speed ship technology.

The bottom surface of the hull of a conventional planing boat is a continuous surface, which is attached to the bottom of the hull structure and rigidly connected to the deck platform rather than being independently. When sailing, there is only one supporting surface at the bottom of the hull, so the pitch angle at the bottom of the hull is difficult to keep under control whether in still water or in waves, and the hull attitude is very unstable.

The bottom surface of the hull of a stepped planing boat is composed of two parts: a front planing surface and a rear planing surface, with the break in the middle of the hull as the boundary. The front planing surface is located below a forward extension line of the rear planing surface, and there is a height difference therebetween. Both the front planing surface and the rear planing surface are attached to the bottom of the same hull structure and rigidly connected to the deck platform rather than being independent. When sailing, there are two supporting surfaces at the bottom of the hull, so in still water, the pitch angle at the bottom of the hull is very stable, and the hull attitude is thus very stable. However, the hull attitude is difficult to maintain stable in waves, and the seakeeping performance is very poor.

SUMMARY OF THE PRESENT INVENTION

In view of the above-mentioned shortcomings in the prior art, the present invention provides a multihull stepped planing boat with multiple independent elastic planing surfaces, wherein a main hull and sub-hulls are connected through a shock-absorbing structure to greatly reduce a pitch natural frequency, making wave encounter frequency to the hull easily exceed the pitch natural frequency, and ultimately enables the planing boat to achieve ultra-high-speed navigation with good stability in both still water and large wave environments.

Accordingly, in order to accomplish the above objects, the present invention provides:

a multihull stepped planing boat with multiple independent elastic planing surfaces, comprising: a main hull, X front planing sub-hulls arranged side by side under a front portion of the main hull, and Y rear planing sub-hull arranged side by side under a rear portion of the main hull; wherein X and Y are positive integers, and $3 \leq X+Y \leq 8$;

the X front planing sub-hulls are equally spaced, and the Y rear planing sub-hulls are also equally spaced; there is a gap between the X front planing sub-hulls and the Y rear planing sub-hulls;

front planing surfaces, which are in contact with a water surface, are provided at bottoms of the front planing sub-hulls; and rear planing surfaces, which are in contact with the water surface, are provided at bottoms of the rear planing sub-hulls; the front planing surfaces and the rear planing surfaces are parallel to each other; the X front planing surfaces are set at a same height, and the Y rear planing surfaces are set at another same height; there is a height difference H between the front planing surfaces and the rear planing surfaces, so as to form a step of the planing boat;

left and right sides of front portions on top surfaces of the front planing sub-hulls and the rear planing sub-hulls are connected to a bottom of the main hull through hinge structures; the hinge structures of the front planing sub-hulls are located on a same transverse axis, and the hinge structures of the rear planing sub-hulls are located on another same transverse axis; rear portions on the top surfaces of the front planing sub-hulls and the rear planing sub-hulls are connected to the bottom of the main hull through elastic shock absorption structures which are vertically arranged.

Preferably, left and right sides of the front planing sub-hulls and the rear planing sub-hulls are parallel to each other; left and right sidewalls of the front planing surfaces and the rear planing surfaces vertically extend downwards to a certain distance, so as to form independent longitudinal channels under the front planing sub-hulls and the rear planing sub-hulls.

Preferably, the front planing surfaces and the rear planing surfaces are flat surfaces, which form a longitudinal angle A with a horizontal plane, and the longitudinal angle A ranges from 1-10°.

Preferably, the front planing surfaces and the rear planing surfaces are all longitudinally arranged V-shaped symmetrical surfaces; longitudinal centerlines of the V-shaped symmetrical surfaces form a longitudinal angle A with a horizontal plane, and the longitudinal angle A ranges from 1-10°; the V-shaped symmetrical surfaces have a transverse angle B, and the transverse angle B ranges from 160-178°.

Preferably, each of the hinge structures comprises an upper hinge support and a lower hinge support which are hinged together through a transverse pin shaft; the upper hinge support is fixed on the main hull, and the lower hinge support is fixed on a corresponding front planing sub-hull or rear planing sub-hull.

Preferably, the shock absorption structures use hydraulic damping spring shock absorbers.

Preferably, when X=Y, the front planing sub-hulls and the rear planing sub-hulls are aligned longitudinally; propellers are arranged at rear portions of the front planing sub-hulls and/or rear portions of the rear planing sub-hulls.

Preferably, when X=Y+1 or Y=X+1, the front planing sub-hulls and the rear planing sub-hulls are staggered longitudinally; propellers are arranged at rear portions of the front planing sub-hulls and/or rear portions of the rear planing sub-hulls.

Preferably, the main hull adopts a modular structure, comprising Z independent main hull modules which are detachably connected through connecting pieces, and $Z \geq X+Y$.

Preferably, three front planing sub-hulls are arranged side by side under the front portion of the main hull, and three rear planing sub-hulls are arranged side by side under the rear portion of the main hull; two land travelling modules are arranged side by side under a middle portion of the main hull; the two land travelling modules, the three front planing sub-hulls, and the three rear planing sub-hulls are staggered transversely; each of the land travelling modules comprises a travelling frame, and multiple travelling wheels which are rotatably connected to the travelling frame lengthwise; wherein a crawler belt is jointly supported by surfaces of the multiple travelling wheels; one of the working wheels is connected to a driving mechanism; front and rear portions of the travelling frame are respectively hinged to lower ends of two landing gears, and upper ends of the two landing gears are hinged to the bottom of the main hull; middle portions of the landing gears are respectively hinged to driving ends of two lifting cylinders, and cylinder bodies of the two lifting cylinders are hinged to the main hull.

Beneficial effects of the present invention are as follows:

In the present invention, the planing surface of the main hull is formed by a plurality of independent and spaced sub-planing surfaces. There is a certain elastic buffer space between each sub-planing surface and the main hull, and the shock absorption structures can absorb most of the shocks, thereby reducing the impact of water surface waves on the vibration of the main hull during high-speed navigation. The main hull is flexibly connected to the front and rear planing sub-hulls through the hinge structures and the shock absorption structures, which can greatly reduce the pitch natural frequency of the main hull, so as to enter the supercritical navigation state more easily. Furthermore, such structures can also greatly absorb and dissolve the impact of waves on the front and rear planing sub-hulls. With elasticity, the overall wave resistance of the planing boat is improved, and the rough water resistance is reduced accordingly. As a result, no stall occurs in the waves, thereby greatly improving the speed of the planing boat, and achieving ultra-high speed in the waves. When the shock absorption structure of the present invention adopts a hydraulic damping spring, the pitch natural frequency of the main hull can be greatly reduced by adjusting elastic coefficient and damping coefficient of the hydraulic damping spring, so that the wave encounter frequency of the hull can easily exceed the pitch natural frequency, thereby realizing the ideal state of supercritical navigation and ultra-high-speed navigation. The planing surfaces of the sub-hulls of the present invention form a certain longitudinal angle with the horizontal plane. The multiple sub-hulls that maintain a certain longitudinal angle together stabilize the hull during high-speed planing, in such a manner that the sailing resistance is greatly reduced, and the stable planing speed can reach 100 knots or above. the left and right sides of the front planing sub-hulls and the rear planing sub-hulls of the present invention extend vertically downwards and respectively exceed the bottom surfaces of the front and rear planing sub-hulls by a certain distance, so as to form independent longitudinal channels under the front planing sub-hulls and the rear planing sub-hulls to stabilize flows, thereby suppressing the splashes and surges caused by the sub-hulls during high-speed navigation, effectively avoiding the impact and attraction of fluid between the sub-hulls, and greatly reducing the sailing resistance. The front planing sub-hulls and the rear planing sub-hulls of the present invention share the same contour and size, which not only have good interchangeability and high reliability for modular and standardized design, but also can effectively reduce production and maintenance costs. The modular structures of the main hull of the present invention can be easily loaded into standard containers for transportation and storage.

Figure 1:
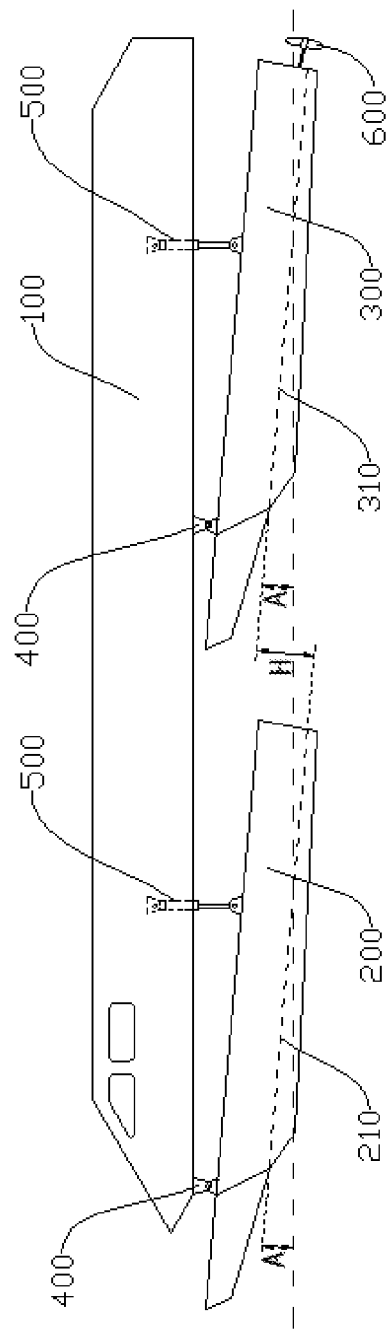
FIG. 1 is a left view according to an embodiment 1 of the present invention.

Element reference: 100—main hull; 200—front planing sub-hull; 210—front planing surface; 300—rear planing sub-hull; 310—rear planing surface; 400—hinge structure; 410—upper hinge support; 420—lower hinge support; 500—shock absorption structure; 510—hydraulic damping spring shock absorber; 600—propeller; 700—land travelling module; 710—landing gear; 720—lifting cylinder; 730—travelling frame; 740—travelling wheel; 750—crawler belt.

DETAILED DESCRIPTION OF THE PREFERRED EMBODIMENT

Referring to the drawings, embodiments of the present invention will be further illustrated.

Figure 2:
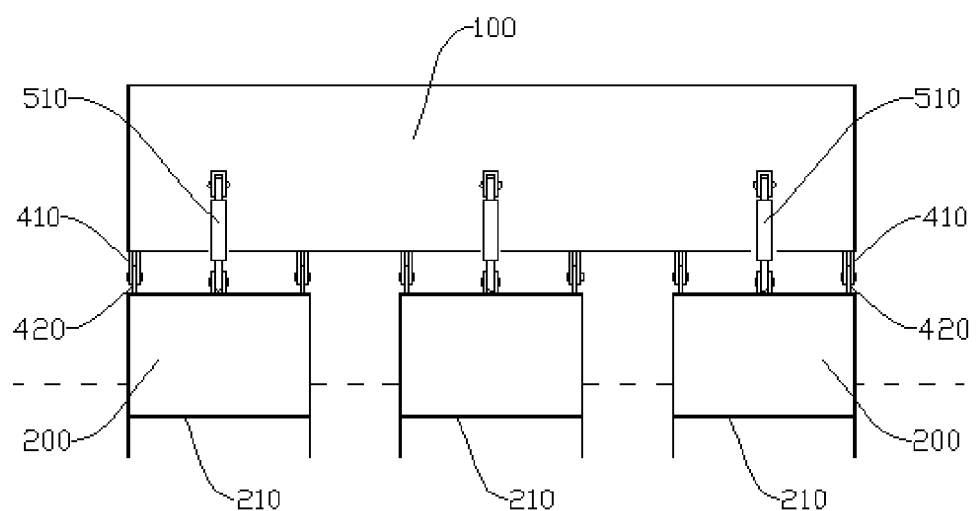
FIG. 2 is a cross-sectional view according to the embodiment 1 of the present invention.

Referring to FIGS. 1 and 2, an embodiment 1 of the present invention is illustrated, comprising: a main hull 100, X equally spaced front planing sub-hulls 200 arranged side by side under a front portion of the main hull 100, and Y equally spaced rear planing sub-hull 300 arranged side by side under a rear portion of the main hull 100. There is a gap between the X front planing sub-hulls 200 and the Y rear planing sub-hulls 300. When sailing, the front planing sub-hulls 200 and the rear planing sub-hulls 300 are in contact with water, while the main hull 100 is suspended above the water without contact.

Front planing surfaces 210, which are in contact with a water surface, are provided at bottoms of the front planing sub-hulls 200; and rear planing surfaces 310, which are in contact with the water surface, are provided at bottoms of the rear planing sub-hulls 300; the front planing surfaces 210 and the rear planing surfaces 310 are parallel to each other; the X front planing surfaces 210 are set at a same height, and the Y rear planing surfaces 310 are set at another same height; there is a height difference H between the front planing surfaces 210 and the rear planing surfaces 310, so as to form a step of the planing boat.

According to the embodiment 1 as illustrated in FIGS. 1 and 2, the front planing surfaces 210 and the rear planing surfaces 310 are flat surfaces.

To stabilize the front planing sub-hulls 200 and the rear planing sub-hulls 300 during navigation and reduce sailing resistance, the front planing surfaces 210 and the rear planing surfaces 310 form a longitudinal angle A with a horizontal plane, and the longitudinal angle A ranges from 1-10°.

When the longitudinal angle A is 4°, the hull attitude is in the most stable state, the sailing resistance is the least, and the planing speed is the highest.

According to the embodiment 1 as illustrated in FIGS. 1 and 2, left and right sides of the front planing sub-hulls 200 and the rear planing sub-hulls 300 are parallel to each other; left and right sidewalls of the front planing surfaces 210 and the rear planing surfaces 310 vertically extend downwards to a certain distance, so as to form independent longitudinal channels under the front planing sub-hulls 200 and the rear planing sub-hulls 300 to stabilize flows, thereby suppressing the splashes and surges caused by the sub-hulls during high-speed navigation, effectively avoiding the impact and attraction of fluid between the sub-hulls, and greatly reducing the sailing resistance.

According to the embodiment 1, the front planing sub-hulls 200 and the rear planing sub-hulls 300 share the same contour and size, which not only have good interchangeability and high reliability for modular and standardized design, but also can effectively reduce production and maintenance costs.

According to the embodiment 1, it is equivalent to dividing the bottom surface of the whole planing boat into a front planing surface and a rear planing surface along the transverse stepped line. At the same time, the front planing surface is equally spaced into X front sub-planing surfaces, and the rear planing surface is equally spaced into Y rear sub-planing surfaces, in such a manner that a conventional integrated planing surface is divided into several independent sub-planing surfaces.

According to the embodiment 1 as illustrated in FIGS. 1 and 2, left and right sides of front portions on top surfaces of the front planing sub-hulls 200 and the rear planing sub-hulls 300 are connected to a bottom of the main hull 100 through hinge structures 400; the hinge structures 400 of the front planing sub-hulls 200 are located on a same transverse axis, and the hinge structures 400 of the rear planing sub-hulls 300 are located on another same transverse axis; rear portions on the top surfaces of the front planing sub-hulls 200 and the rear planing sub-hulls 300 are connected to the bottom of the main hull 100 through elastic shock absorption structures 500 which are vertically arranged. The weight of the main hull 100 is supported by the elastic shock absorption structures 500, thereby reducing the vibration transmitted from the front planing sub-hulls 200 and the rear planing sub-hulls 300 to the main hull 100 during navigation, and improving stability of the main hull 100.

According to the embodiment 1, the main hull 100 is flexibly connected to the front planing sub-hulls 200 and the rear planing sub-hulls 300 through the hinge structures 400 and the shock absorption structures 500, which can greatly reduce the pitch natural frequency of the main hull 100, so as to enter the supercritical navigation state more easily. Furthermore, such structures can also greatly absorb and dissolve the impact of waves on the front planing sub-hulls 200 and the rear planing sub-hulls 300. With elasticity, the overall wave resistance of the planing boat is improved, and the rough water resistance is reduced accordingly. As a result, no stall occurs in the waves, thereby greatly improving the speed of the planing boat, and achieving ultra-high speed in the waves (≥80 knots).

During planing, the front planing sub-hulls 200 and the rear planing sub-hulls 300 can move around the hinge structures 400 within a range of angle A, so that stems of the sub-hulls can do vertical undulating motion with a stroke of L, and L is a height difference when the sub-hulls cross the waves. Therefore, the longer the length of the sub-hull, the greater the vertical stroke L of the stem of the sub-hull, which means better seakeeping.

Like automobile shock absorption technology, unsprung weight is an important indicator of shock absorption effect. A small unsprung weight means a better shock absorption effect. According to the present invention, the main hull 100 is flexibly connected to the front planing sub-hulls 200 and the rear planing sub-hulls 300. The front half of the sub-hull is limited by the hinge structure, and only the rear half responds to the undulating motion. That is to say, the unsprung weight is only half of the sub-hull weight, and the wave impact only involves half of the sub-hull weight. Therefore, the unsprung weight of the present invention is very low, and the shock absorption effect is very good.

According to the embodiment 1 as illustrated in FIGS. 1 and 2, each of the hinge structures 400 comprises an upper hinge support 410 and a lower hinge support 420 which are hinged together through a transverse pin shaft; the upper hinge support 410 is fixed on the main hull 100, and the lower hinge support 420 is fixed on a corresponding front planing sub-hull 200 or rear planing sub-hull 300.

According to the embodiment 1 as illustrated in FIGS. 1 and 2, the shock absorption structures 500 use hydraulic damping spring shock absorbers 510. The pitch natural frequency of the main hull 100 can be greatly reduced by adjusting elastic coefficient and damping coefficient of the hydraulic damping spring shock absorbers 510, so that the wave encounter frequency of the hull can easily exceed the pitch natural frequency, thereby realizing the ideal state of supercritical navigation and ultra-high-speed navigation.

Figure 3:
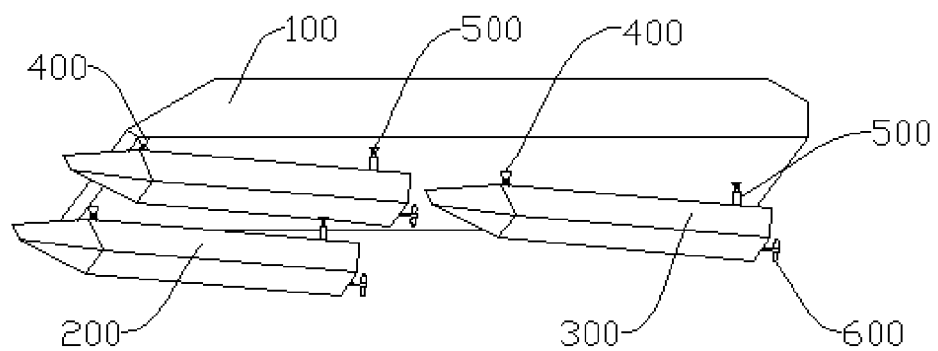
FIG. 3 is a perspective view according to an embodiment 2 of the present invention.

According to an embodiment 2 as illustrated in FIG. 3, there are two front planing sub-hulls 200 and one rear planing sub-hull 300. Propellers 600 are arranged at rear portions of the two front planing sub-hulls 200 and a rear portion of the one rear planing sub-hull 300.

Figure 4:
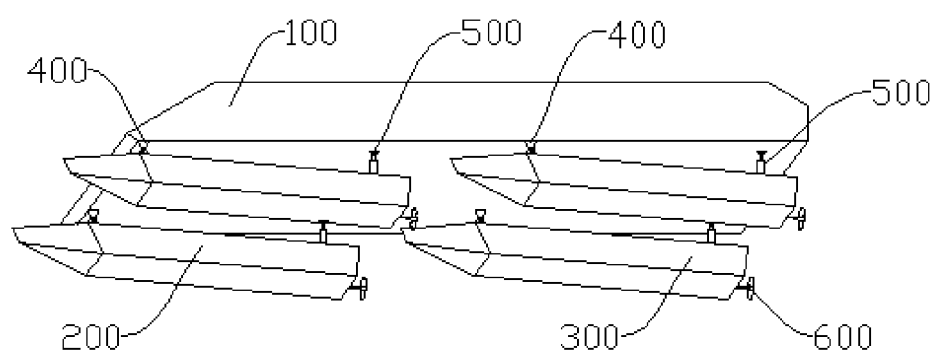
FIG. 4 is a perspective view according to an embodiment 3 of the present invention.

According to an embodiment 3 as illustrated in FIG. 4, there are two front planing sub-hulls 200 and two rear planing sub-hulls 300. Propellers 600 are arranged at rear portions of the two rear planing sub-hulls 300.

Figure 5:
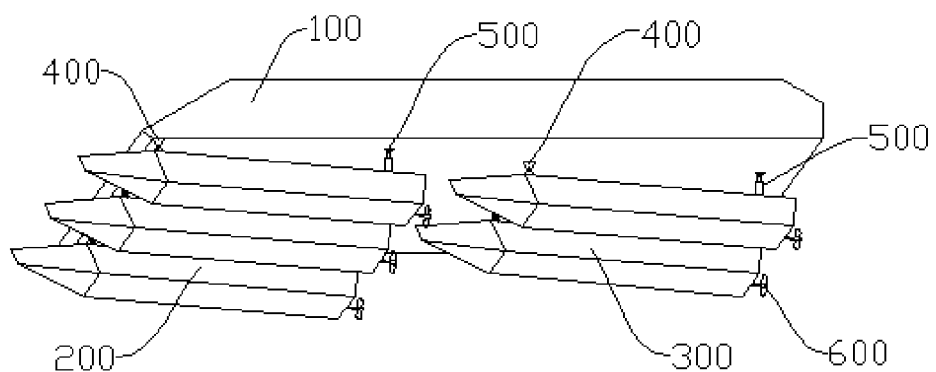
FIG. 5 is a perspective view according to an embodiment 4 of the present invention.

According to an embodiment 4 as illustrated in FIG. 5, there are three front planing sub-hulls 200, and propellers 600 are arranged at rear portions of the three front planing sub-hulls 200. There are two rear planing sub-hulls 300, and propellers 600 are arranged at rear portions of the two rear planing sub-hulls 300.

Figure 6:
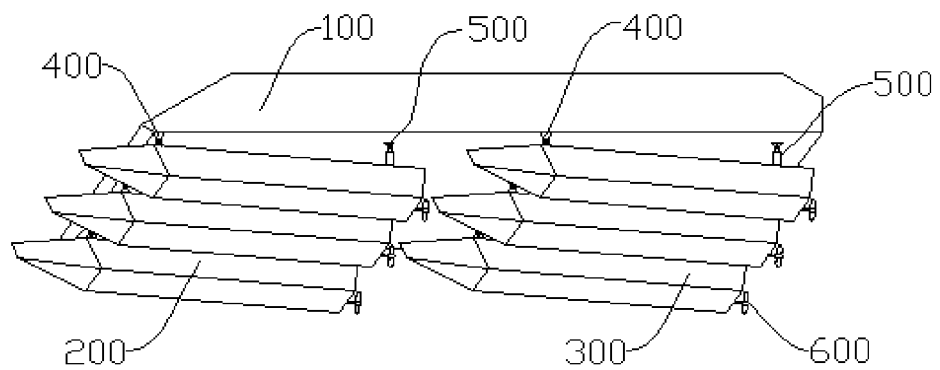
FIG. 6 is a perspective view according to an embodiment 5 of the present invention.

According to an embodiment 5 as illustrated in FIG. 6, there are three front planing sub-hulls 200 and three rear planing sub-hulls 300. Propellers 600 are arranged at rear portions of the three rear planing sub-hulls 300.

Figure 7:
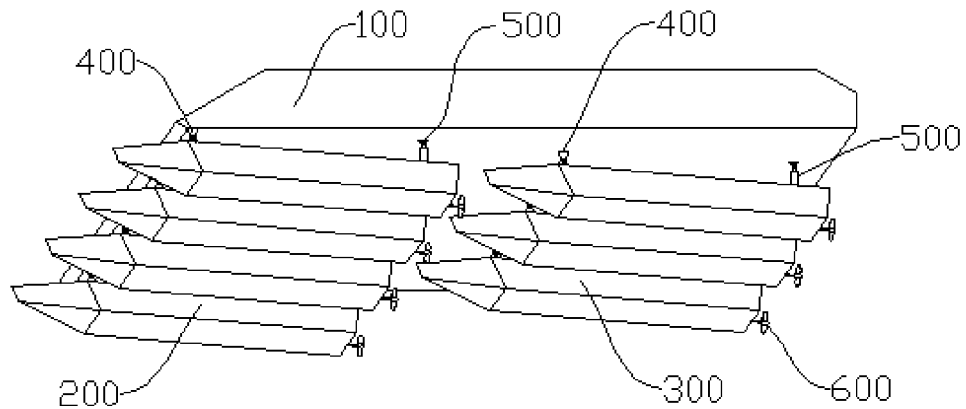
FIG. 7 is a perspective view according to an embodiment 6 of the present invention.

According to an embodiment 6 as illustrated in FIG. 7, there are four front planing sub-hulls 200, and propellers 600 are arranged at rear portions of the four front planing sub-hulls 200. There are three rear planing sub-hulls 300, and propellers 600 are arranged at rear portions of the three rear planing sub-hulls 300.

Figure 8:
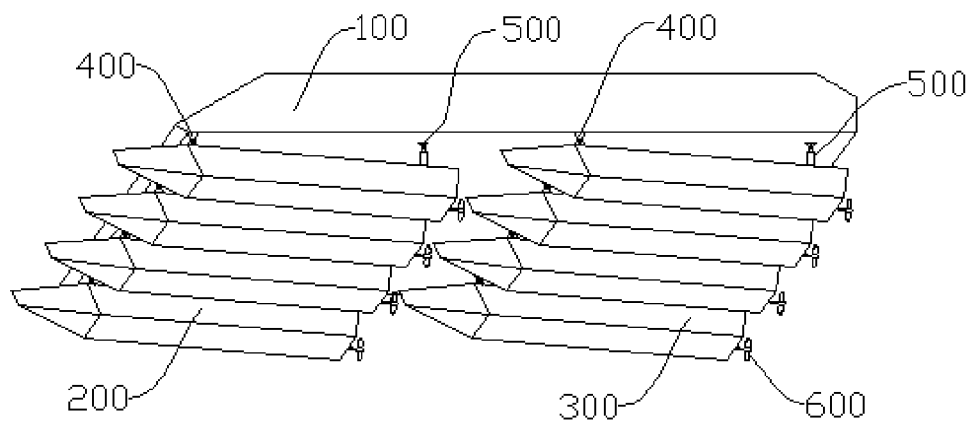
FIG. 8 is a perspective view according to an embodiment 7 of the present invention.

According to an embodiment 7 as illustrated in FIG. 8, there are four front planing sub-hulls 200 and four rear planing sub-hulls 300. Propellers 600 are arranged at rear portions of the four rear planing sub-hulls 300.

According to the embodiment 2-7, $3 \leq X+Y \leq 8$ and X and Y are positive integers. Such range provides an optimized planing effect.

When X=Y, the front planing sub-hulls 200 and the rear planing sub-hulls 300 are aligned longitudinally; propellers 600 are arranged at rear portions of the front planing sub-hulls 200 and/or rear portions of the rear planing sub-hulls 300.

When X=Y+1 or Y=X+1, the front planing sub-hulls 200 and the rear planing sub-hulls 300 are staggered longitudinally; propellers 600 are arranged at rear portions of the front planing sub-hulls 200 and/or rear portions of the rear planing sub-hulls 300.

Figure 9:
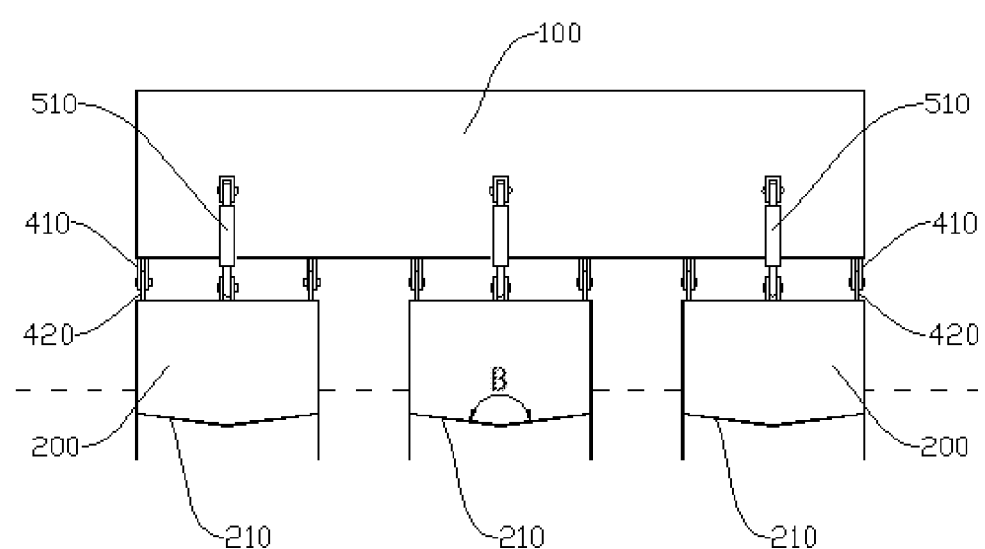
FIG. 9 is a cross-sectional view according to an embodiment 8 of the present invention.

According to an embodiment 8 as illustrated in FIG. 9, the front planing surfaces 210 and the rear planing surfaces 310 are all longitudinally arranged V-shaped symmetrical surfaces; longitudinal centerlines of the V-shaped symmetrical surfaces form a longitudinal angle A with a horizontal plane, and the longitudinal angle A ranges from 1-10°; the V-shaped symmetrical surfaces have a transverse angle B, and the transverse angle B ranges from 160-178°. As a result, the bottom surfaces of the sub-hulls are relatively flat, which not only ensure the planing effect of the sub-hulls, but also correspondingly weaken the impact of waves on the bottom of the sub-hulls, thereby correspondingly improving the structural strength of the sub-hulls.

Figure 10:
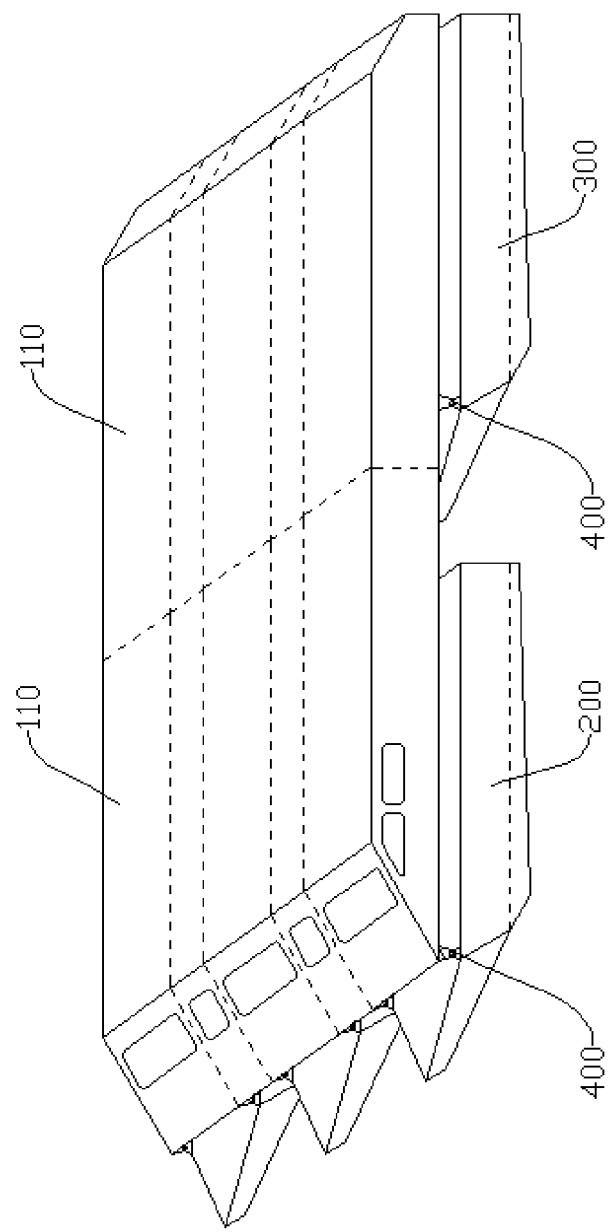
FIG. 10 is a perspective view according to an embodiment 9 of the present invention.

According to an embodiment 9 as illustrated in FIG. 10, the main hull 100 adopts a modular structure, comprising Z independent main hull modules 110 which are detachably connected through connecting pieces, and Z≥X+Y. The modular structures of the main hull 100 can be easily loaded into standard containers for transportation and storage.

Figure 11:
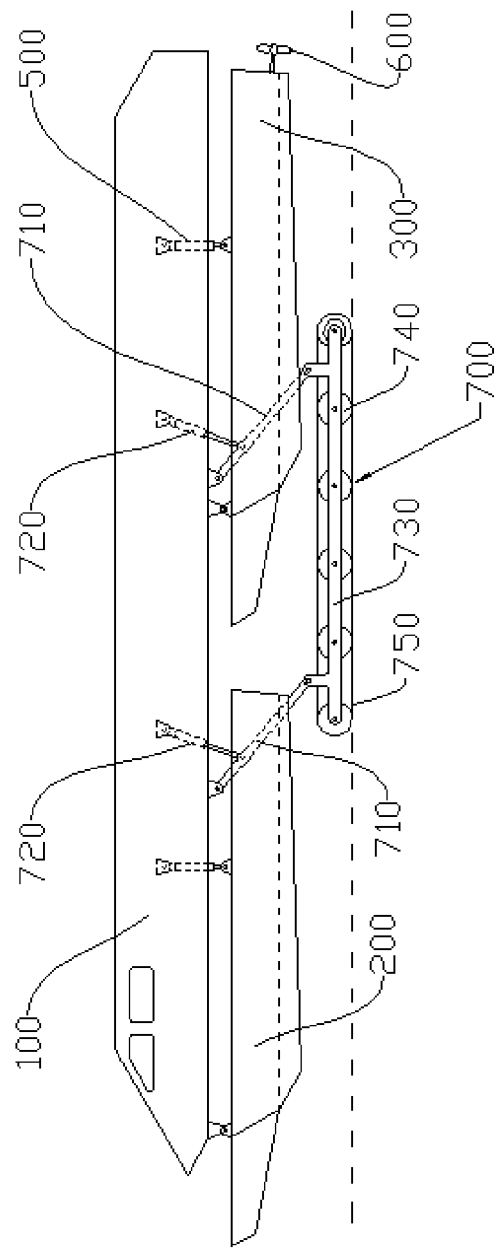
FIG. 11 is a left view according to an embodiment 10 of the present invention.
Figure 12:
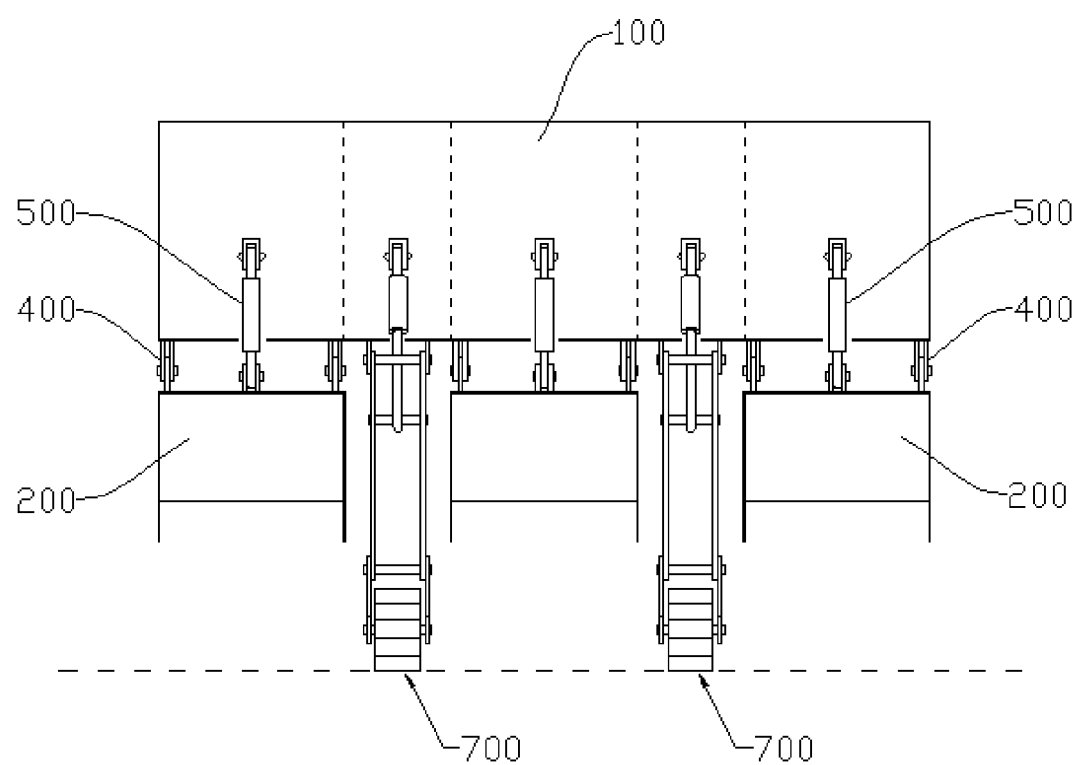
FIG. 12 is a cross-sectional view according to an embodiment 10 of the present invention.

According to an embodiment 10 as illustrated in FIGS. 11 and 12, a multihull stepped planing boat with multiple independent elastic planing surfaces is provided, wherein three front planing sub-hulls 200 are arranged side by side under the front portion of the main hull 100, and three rear planing sub-hulls 300 are arranged side by side under the rear portion of the main hull 100; two land travelling modules 700 are arranged side by side under a middle portion of the main hull 100; the two land travelling modules 700, the three front planing sub-hulls 200, and the three rear planing sub-hulls 300 are staggered transversely.

According to the embodiment as illustrated in FIG. 11, each of the land travelling modules 700 comprises a travelling frame 730, and multiple travelling wheels 740 which are rotatably connected to the travelling frame 730 lengthwise; wherein a crawler belt 750 is jointly supported by surfaces of the multiple travelling wheels 740; one of the working wheels 740 is connected to a driving mechanism; front and rear portions of the travelling frame 730 are respectively hinged to lower ends of two landing gears 710, and upper ends of the two landing gears 710 are hinged to the bottom of the main hull 100; middle portions of the landing gears 710 are respectively hinged to driving ends of two lifting cylinders 720, and cylinder bodies of the two lifting cylinders 720 are hinged to the main hull 100.

When the multihull stepped planing boat is planing on the water surface, the two lifting cylinders 720 push the travelling frame 730 to retract and press against the bottom surface of the main hull 100. At this time, the land travelling module 700 is not in contact with the water surface and does not affect the planing of the multihull stepped planing boat. When the multihull stepped planing boat is landed from the water surface, the two lifting cylinders 720 push the travelling frame 730 to the ground. The multihull stepped planing boat relies on the crawler belt 750 to travel on land.

A ship model test in a high-speed towing pool was carried out for the present invention. A towing speed of a ship model was 16 m/s, which represents a real ship speed of 100 knots (185 km/h). Professional organization evaluation of the test results is: excellent high-speed performance, very stable navigation state, and sufficient resistance performance. Experimental results proved that the high-speed performance and seakeeping performance of the present invention are excellent, which completely solve the inherent contradiction that hinders the development of the planing boats for a long time, and has great technical significance in the field of high-speed ships.

The above description is an explanation of the present invention rather than a limitation. The scope of the present invention is defined by the following claims, which covers any modification made within the protection scope of the present invention.

What is claimed is:

1. A multihull stepped planing boat with multiple independent elastic planing surfaces, comprising: a main hull (100), X front planing sub-hulls (200) arranged side by side under a front portion of the main hull (100), and Y rear planing sub-hull (300) arranged side by side under a rear portion of the main hull (100); wherein X and Y are positive integers, and 3≤X+Y≤8;

the X front planing sub-hulls (200) are equally spaced, and the Y rear planing sub-hulls (300) are also equally spaced; there is a gap between the X front planing sub-hulls (200) and the Y rear planing sub-hulls (300); front planing surfaces (210), which are in contact with a water surface, are provided at bottoms of the front planing sub-hulls (200); and rear planing surfaces (310), which are in contact with the water surface, are provided at bottoms of the rear planing sub-hulls (300); the front planing surfaces (210) and the rear planing surfaces (310) are parallel to each other; the X front planing surfaces (210) are set at a same height, and the Y rear planing surfaces (310) are set at another same height; there is a height difference H between the front planing surfaces (210) and the rear planing surfaces (310), so as to form a step of the planing boat;

left and right sides of front portions on top surfaces of the front planing sub-hulls (200) and the rear planing sub-hulls (300) are connected to a bottom of the main hull (100) through hinge structures (400); the hinge structures (400) of the front planing sub-hulls (200) are located on a same transverse axis, and the hinge structures (400) of the rear planing sub-hulls (300) are located on another same transverse axis; rear portions on the top surfaces of the front planing sub-hulls (200) and the rear planing sub-hulls (300) are connected to the bottom of the main hull (100) through elastic shock absorption structures (500) which are vertically arranged; the front planing surfaces (210) and the rear planing surfaces (310) are flat surfaces, which form a longitudinal angle A with a horizontal plane, and the longitudinal angle A ranges from 1-10°.

2. The multihull stepped planing boat, as recited in claim 1, wherein left and right sides of the front planing sub-hulls (200) and the rear planing sub-hulls (300) are parallel to each other; left and right sidewalls of the front planing surfaces (210) and the rear planing surfaces (310) vertically extend downwards to a certain distance, so as to form independent longitudinal channels under the front planing sub-hulls (200) and the rear planing sub-hulls (300).

3. The multihull stepped planing boat, as recited in claim 1, wherein the front planing surfaces (210) and the rear planing surfaces (310) are all longitudinally arranged V-shaped symmetrical surfaces; the V-shaped symmetrical surfaces have a transverse angle B, and the transverse angle B ranges from 160-178°.

4. The multihull stepped planing boat, as recited in claim 1, wherein each of the hinge structures (400) comprises an upper hinge support (410) and a lower hinge support (420) which are hinged together through a transverse pin shaft; the upper hinge support (410) is fixed on the main hull (100), and the lower hinge support (420) is fixed on a corresponding front planing sub-hull (200) or rear planing sub-hull (300).

5. The multihull stepped planing boat, as recited in claim 1, wherein the shock absorption structures (500) use hydraulic damping spring shock absorbers (510).

6. The multihull stepped planing boat, as recited in claim 1, wherein when X=Y, the front planing sub-hulls (200) and the rear planing sub-hulls (300) are aligned longitudinally; propellers (600) are arranged at rear portions of the front planing sub-hulls (200) and/or rear portions of the rear planing sub-hulls (300).

7. The multihull stepped planing boat, as recited in claim 1, wherein when X=Y+1 or Y=X+1, the front planing sub-hulls (200) and the rear planing sub-hulls (300) are staggered longitudinally; propellers (600) are arranged at rear portions of the front planing sub-hulls (200) and/or rear portions of the rear planing sub-hulls (300).

8. The multihull stepped planing boat, as recited in claim 1, wherein the main hull (100) adopts a modular structure, comprising Z independent main hull modules (110) which are detachably connected through connecting pieces, and Z≥X+Y.

9. The multihull stepped planing boat, as recited in claim 2, wherein the main hull (100) adopts a modular structure, comprising Z independent main hull modules (110) which are detachably connected through connecting pieces, and Z≥X+Y.

10. The multihull stepped planing boat, as recited in claim 3, wherein the main hull (100) adopts a modular structure, comprising Z independent main hull modules (110) which are detachably connected through connecting pieces, and Z≥X+Y.

11. The multihull stepped planing boat, as recited in claim 4, wherein the main hull (100) adopts a modular structure, comprising Z independent main hull modules (110) which are detachably connected through connecting pieces, and Z≥X+Y.

12. The multihull stepped planing boat, as recited in claim 5, wherein the main hull (100) adopts a modular structure, comprising Z independent main hull modules (110) which are detachably connected through connecting pieces, and Z≥X+Y.

13. The multihull stepped planing boat, as recited in claim 6, wherein the main hull (100) adopts a modular structure, comprising Z independent main hull modules (110) which are detachably connected through connecting pieces, and Z≥X+Y.

14. The multihull stepped planing boat, as recited in claim 7, wherein the main hull (100) adopts a modular structure, comprising Z independent main hull modules (110) which are detachably connected through connecting pieces, and Z≥X+Y.

15. The multihull stepped planing boat, as recited in claim 1, wherein three front planing sub-hulls (200) are arranged side by side under the front portion of the main hull (100), and three rear planing sub-hulls (300) are arranged side by side under the rear portion of the main hull (100); two land travelling modules (700) are arranged side by side under a middle portion of the main hull (100); the two land travelling modules (700), the three front planing sub-hulls (200), and the three rear planing sub-hulls (300) are staggered transversely; each of the land travelling modules (700) comprises a travelling frame (730), and multiple travelling wheels (740) which are rotatably connected to the travelling frame (730) lengthwise; wherein a crawler belt (750) is jointly supported by surfaces of the multiple travelling wheels (740); one of the working wheels (740) is connected to a driving mechanism; front and rear portions of the travelling frame (730) are respectively hinged to lower ends of two landing gears (710), and upper ends of the two landing gears (710) are hinged to the bottom of the main hull (100); middle portions of the landing gears (710) are respectively hinged to driving ends of two lifting cylinders (720), and cylinder bodies of the two lifting cylinders (720) are hinged to the main hull (100).

* * * * *